(12) United States Patent
Dice et al.

(10) Patent No.: US 7,575,519 B2
(45) Date of Patent: Aug. 18, 2009

(54) BOOT FOR A JOINT

(75) Inventors: Ronald E. Dice, Buckely, MI (US); Terence Paul Davies, Walled Lake, MI (US); Kevin Paul Horak, Madison Heights, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 0 days.

(21) Appl. No.: 11/756,907

(22) Filed: Jun. 1, 2007

(65) Prior Publication Data

US 2007/0241518 A1    Oct. 18, 2007

Related U.S. Application Data

(63) Continuation of application No. PCT/US2006/002877, filed on Jan. 26, 2006.

(60) Provisional application No. 60/647,087, filed on Jan. 26, 2005.

(51) Int. Cl.
*F16D 3/84* (2006.01)

(52) U.S. Cl. .................................... 464/173

(58) Field of Classification Search ................. 464/146, 464/162, 167, 173, 905, 906; 277/635
See application file for complete search history.

(56) References Cited

U.S. PATENT DOCUMENTS

| | | | | |
|---|---|---|---|---|
| 3,842,621 | A | * 10/1974 | Mazziotti | ................. 277/635 X |
| 4,664,393 | A | 5/1987 | Hazebrook | |
| 5,707,066 | A | * 1/1998 | Sugiura et al. | ............... 464/905 |
| 6,817,950 | B2 | * 11/2004 | Dine | ........................... 464/906 |
| 2002/0187841 | A1 | * 12/2002 | Iihara et al. | |
| 2003/0181247 | A1 | 9/2003 | Cermak et al. | |

* cited by examiner

*Primary Examiner*—Greg Binda
(74) *Attorney, Agent, or Firm*—Jennifer M. Brumbaugh; Mick A. Nylander; Rader, Fishman & Grauer PLLC

(57) ABSTRACT

A boot for a joint includes a shaft-gripping portion, a joint-connecting portion, and a sleeve portion connecting the joint-connecting portion with the shaft-gripping portion. The boot is adapted to dynamically roll about the sleeve portion to a roll position (A, B, C) to form a roll surface having a roll width, $w_{roll}$, wherein the roll width, $w_{roll}$, remains generally constant independent of the roll position (A, B, C). The boot can be used to connect a shaft to a joint portion of the joint and is adapted to allow shaft translation.

16 Claims, 16 Drawing Sheets

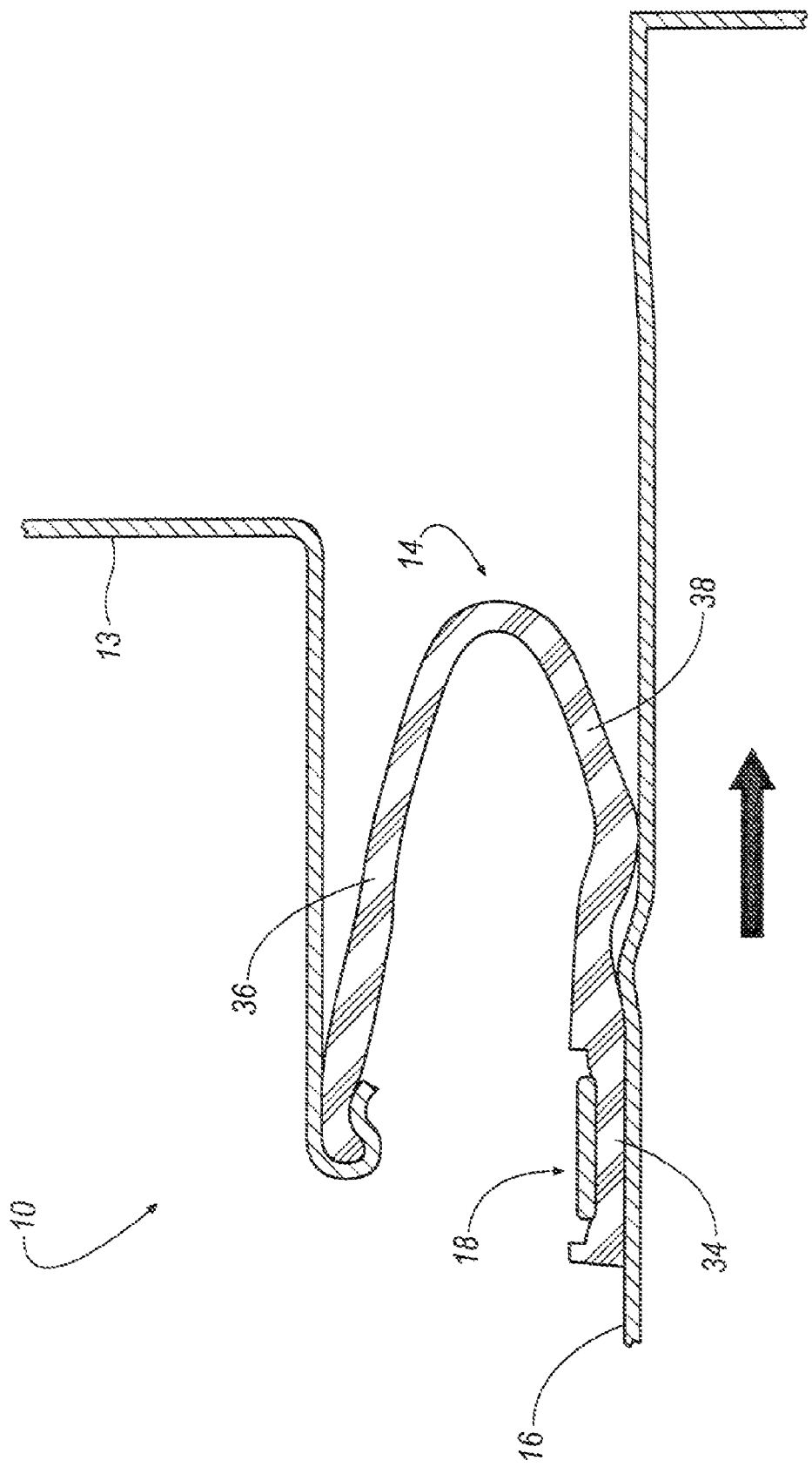

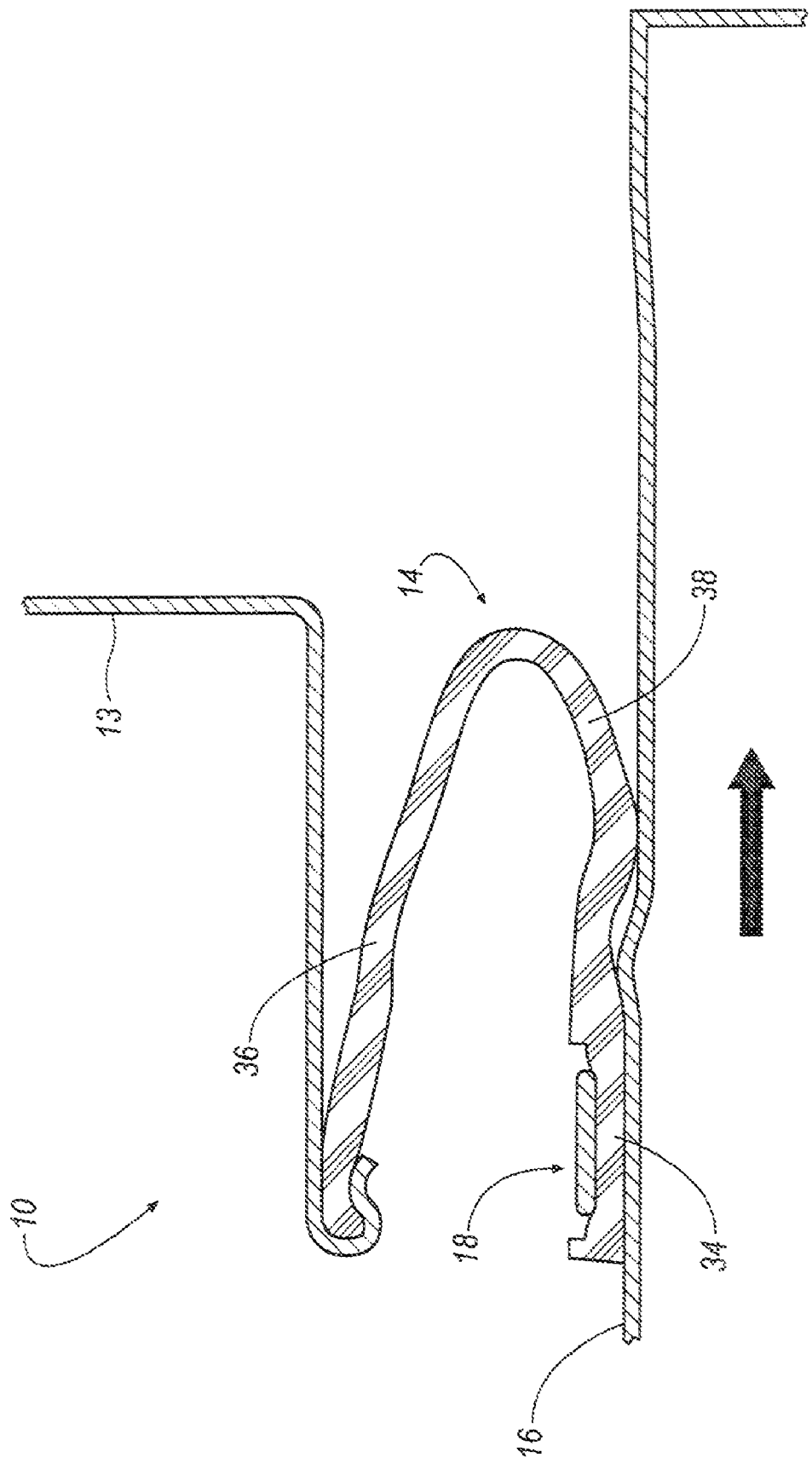

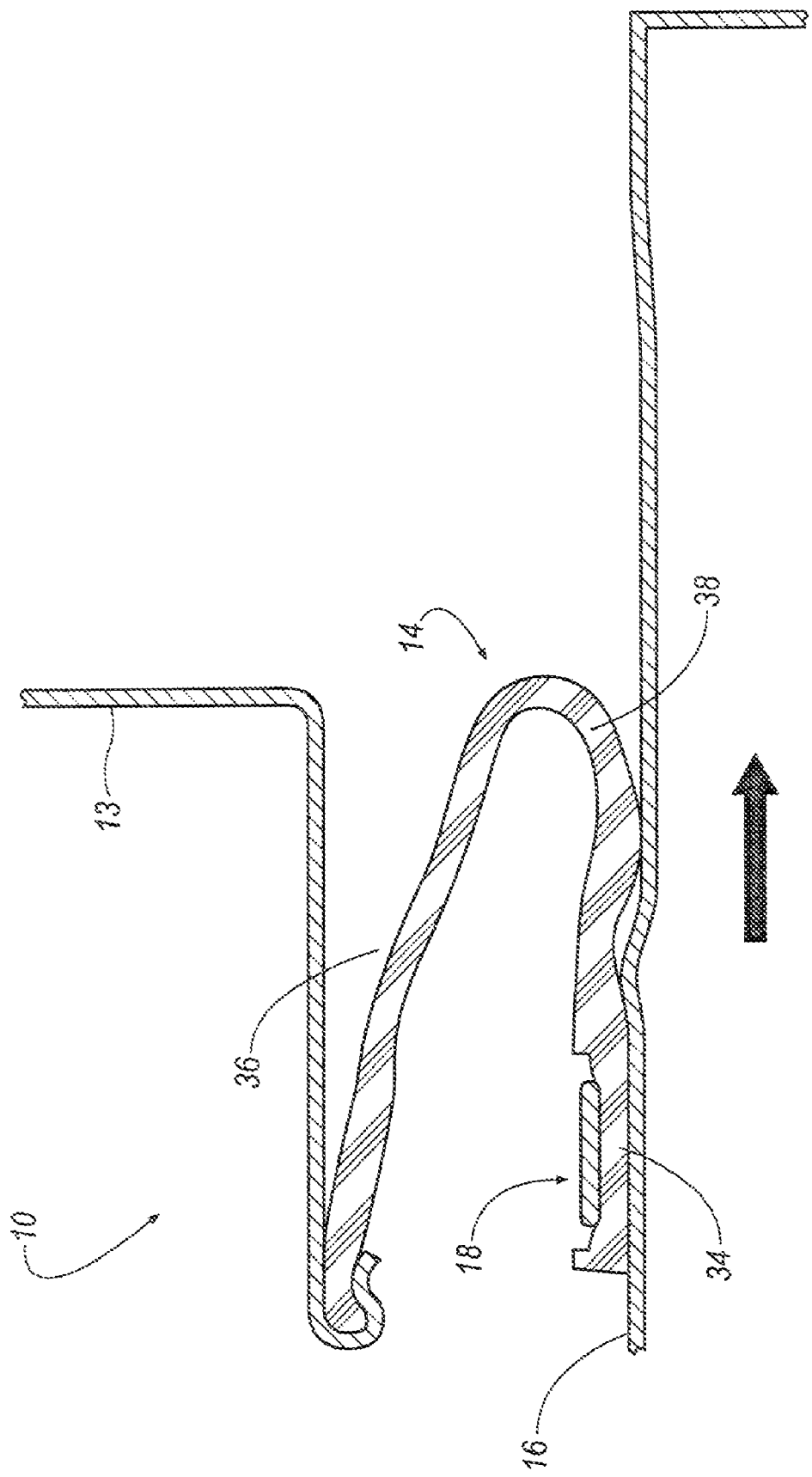

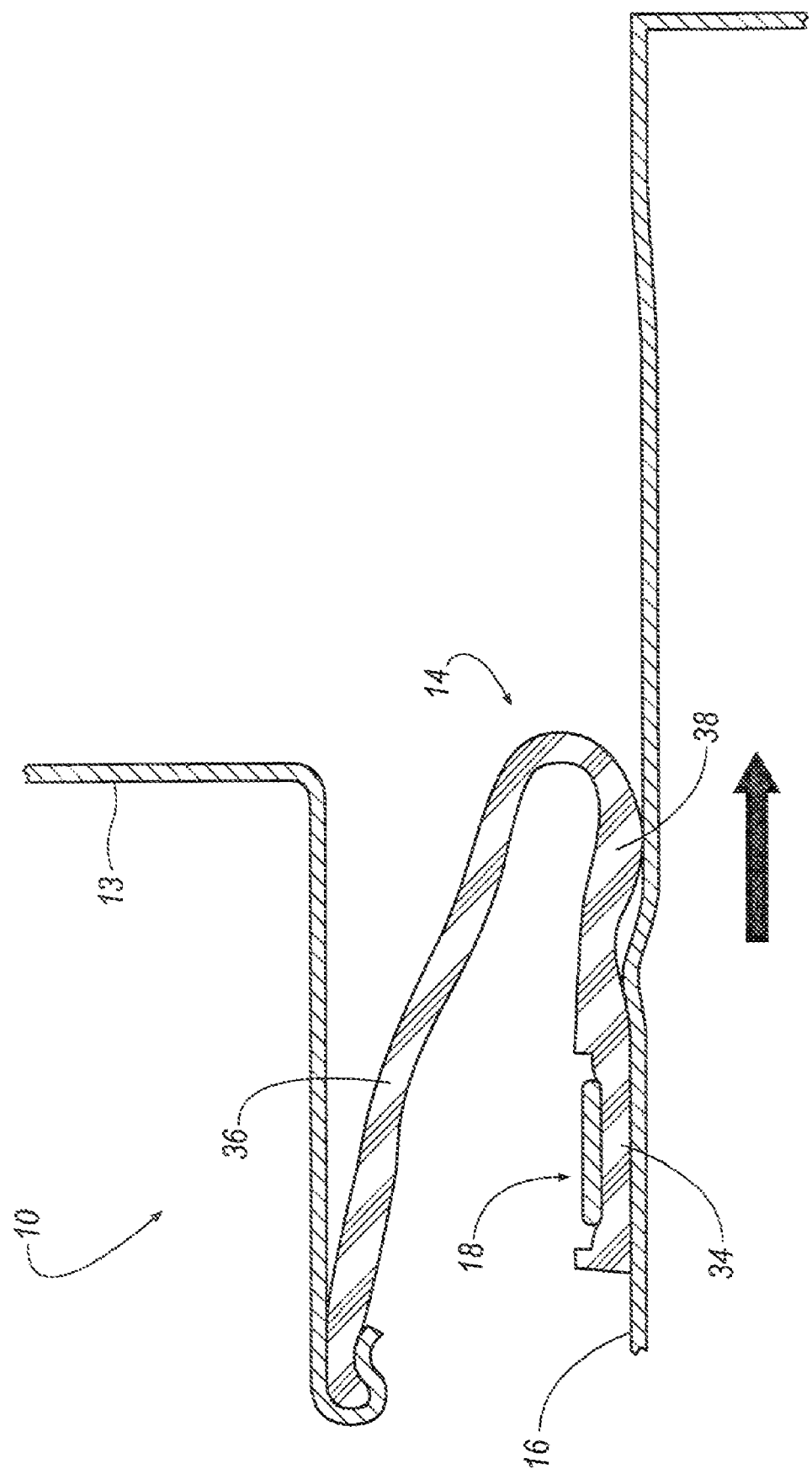

BOOT FOR A JOINT

The present application is a continuation of International Patent Application No. PCT/US2006/002877 with an international filing date of Jan. 26, 2006. The International Application claims priority to U.S. Provisional Application No. 60/647,087 that was filed on Jan. 26, 2005.

FIELD OF INVENTION

The present invention generally relates to a boot for a constant velocity joint and includes a buckling resistant boot for a constant velocity joint.

BACKGROUND

Conventional constant velocity (CV) joints generally include a boot constructed of an elastic material such as silicone or rubber that, as one example, may be used to seal internal components and lubricants from the external environment. In this example, the boot protects the internal components while allowing a shaft to pass from this internal location to the external environment. The boot allows the shaft to pass therethrough by providing an aperture in the boot through which the shaft translates. The edge or wall associated with the aperture is designed to snugly fit against the shaft such that the boot rotates with the shaft.

While the boot sufficiently seals the internal components of the constant velocity joint under most conditions, drawbacks can exist. Specifically, under some circumstances, the outer walls of the aperture of the boot can axially enlarge or shrink (balloon out or in from the axis) to some degree and encounter other portions of the boot or shaft and become irregularly worn. Another such circumstance is when the joint is exposed to large rotational angles or long deviations in plunging. Here, the symmetry of conventional joints at certain points may become irregular or distorted. Such distortion may eventually result in the boot becoming irregularly worn. The present invention was developed in light of these and other potential design considerations.

BRIEF DESCRIPTION OF THE DRAWINGS

Embodiments of the invention will now be described, by way of example with reference to the accompany drawings. Many aspects of the invention can be better understood with reference to the following drawings. These components in the drawings are not necessarily to scale, emphasis instead being placed upon clearly illustrating the principles of the present invention. Moreover, in the drawings, like reference numerals designate corresponding parts throughout several views.

FIG. 19 is an exploded view of a portion of the boot from FIG. 15 in yet another position along the roll;

FIG. 20 is an exploded view of a portion of the boot from FIG. 15 in yet another position along the roll;

FIG. 21 is an exploded view of a portion of the boot from FIG. 15 in yet another position along the roll; and FIG. 22 is an exploded view of a portion of the boot from FIG. 15 in yet another position along the roll.

DETAILED DESCRIPTION

In the following description, for purposes of explanation, numerous specific details are set forth in order to provide a thorough understanding of the present apparatus, including many options associated therewith. It will be apparent, however, to one skilled in the art that the present apparatus may be practiced without these specific details. Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
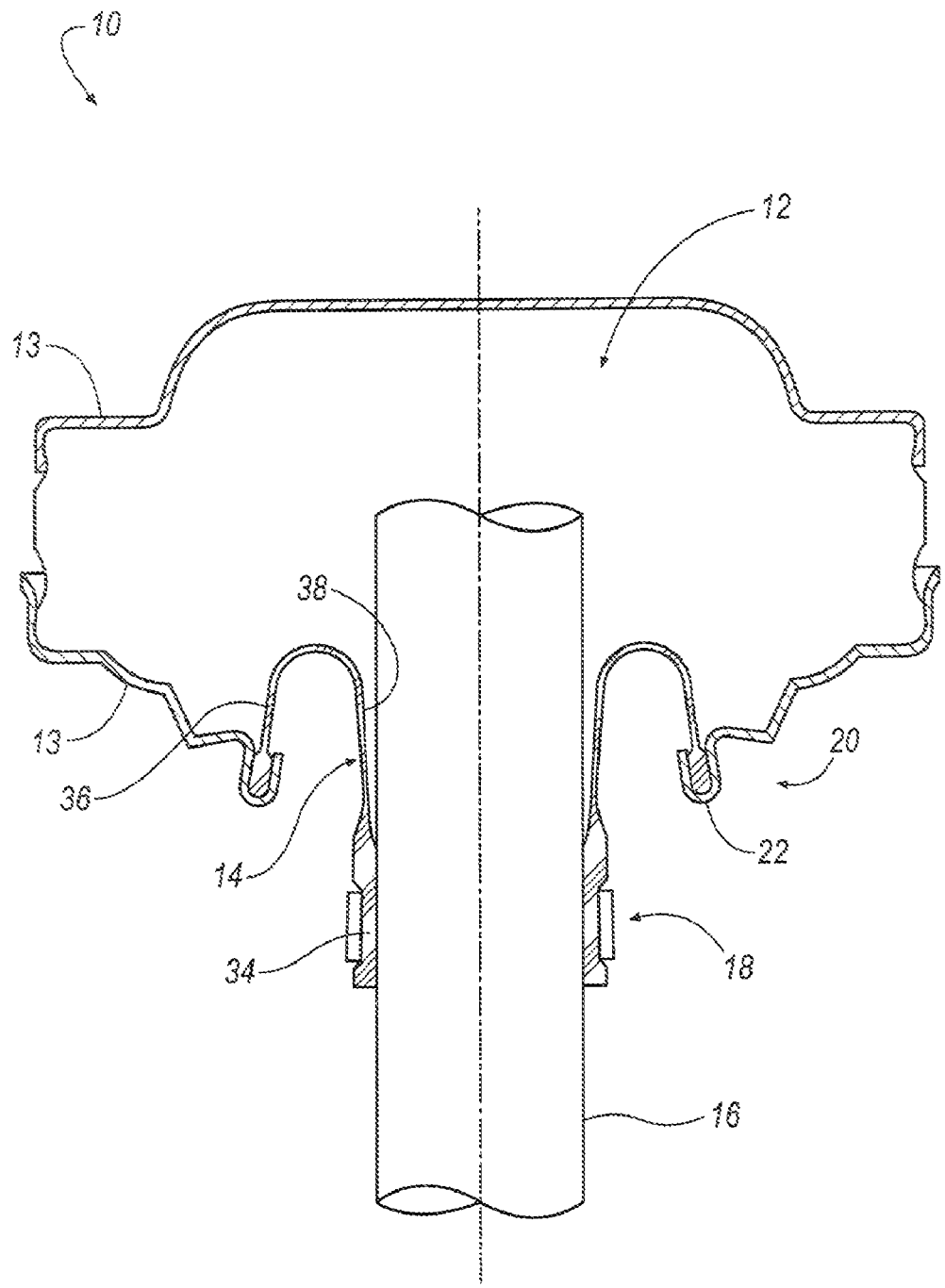
FIG. 1 is a schematic view of a joint according to an embodiment of the present invention.

Referring now to FIG. 1, a joint 10, such as a constant velocity (CV) joint 10, is shown having internal components and lubricants (collectively identified as element 12) within a joint portion 13, boot 14, and shaft 16. The CV joint 10 may be, for example, a fixed joint, plunge joint, slip spline, or other connection.

The boot 14 of the present invention is constructed of an elastic material, such as rubber, silicone, and the like. The boot 14 may be attached or connected to the shaft 16 of the CV joint 10. The boot 14 may additionally be connected to the joint portion 13 (e.g., clamped) at a region 20 by an outer portion 22 of the joint portion 13. The boot 14 is typically intended to be in a non-slip arrangement with the shaft 16 at a region 18. Therefore, as will be understood by one skilled in the art, during proper operation, shaft 16 and boot 14 generally rotate in unison.

With continued reference to FIG. 1, the boot 14 of the present invention can, among other things, permit constant velocity joint 10 to plunge to a further degree from a normal rolled state (the general position depicted in FIG. 3) of the boot 14 (i.e. into and out from the joint portion 13), and articulate at increased angular directions than conventional counterparts. The boot 14 rolls with less distortion than conventional boots and illustrates improved boot performance. Both of these features lessen the opportunity for unforeseeable behavior of boot 14. That is, the present boot 14 can take the form of a low distortion, high performance boot 14. For example, in an embodiment, the boot 14 according to the present invention will at least allow the joint 10 to rotate at or about, for example and without limitation, up to 10,500 rotations per minute, while plunging with deviations of up to ±25 mm from the resting position, and articulating at angles up to 29° with respect to a normal line taken down the center of the shaft 16.

Additionally, it should be noted that various embodiments or alternatives of boot 14 may be employed in the constant velocity joint 10, as represented throughout the Figures. It is also preliminarily noted that boot 14 may be manufactured or molded in either the extended (unrolled) position as represented in an embodiment at FIG. 2, or in the rolled or partially rolled position as represented in embodiments portrayed in FIGS. 3-13. Additionally, when molded in the rolled position, the boot 14 may be molded at any point along the roll (e.g. at, between, or beyond the roll positions designated by lines A, B, or C as referenced in FIG. 2.) The advantages of each molding technique will be discussed in further detail herein below, which will become readily apparent to one of ordinary skill in the art when considering the present disclosure.

Figure 2:
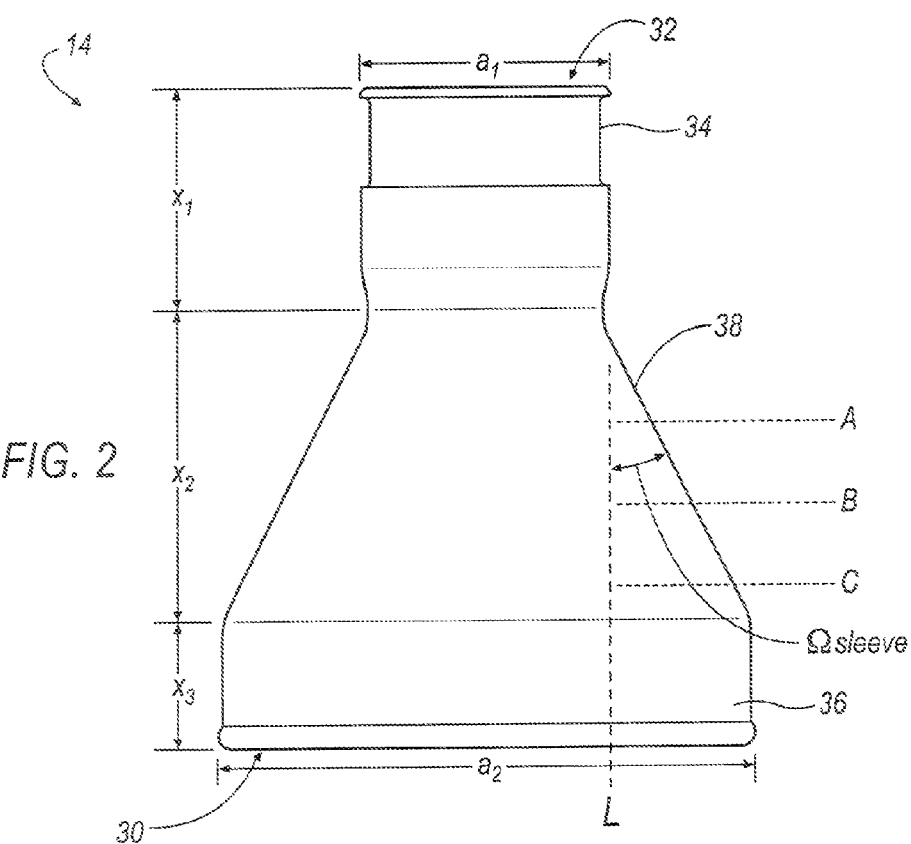
FIG. 2 is an elevated side plan view of a boot for a joint according to an embodiment of the present invention.

Referring now to FIG. 2, a side elevation view of a boot 14 is shown. Boot 14 is in an unrolled configuration. The boot 14 includes a shaft-gripping portion 34, a joint-connecting portion 36 and a sleeve portion 38 extending at an angle (to be specified later) therebetween. The shaft-gripping portion 34 includes an aperture 32 having a diameter ($a_1$) for attaching the boot 14 to an outer surface of the shaft 16 of the CV joint 10. Similarly, the joint-connecting portion 36 includes an aperture 30 having a diameter ($a_2$) for attaching or connecting the boot 14 to the outer portion 22 of the joint portion 20. The shaft-gripping portion 34 engages a segment of the outer surface of the shaft 16. The diameter ($a_1$) of the aperture 32 of the shaft-gripping portion 34 is generally less than the diameter ($a_2$) of the aperture 30 of the joint-connecting portion 36. For example, a ratio of the first diameter ($a_1$) to the second diameter ($a_2$) may be between 1:2 and 1:4. In another embodiment the ratio of the first diameter ($a_1$) to the second diameter ($a_2$) may be between 1:2.65 and 1:3.38. Each of the aforementioned portions 34, 38, 36 includes a length $x_1$, $x_2$, and $x_3$, respectively, as referenced in the drawings. The interrelationship and engagement of these lengths will also be discussed in more detail below.

FIG. 2 illustrates an embodiment of the boot 14 in the extended position, or unrolled state to highlight the sleeve angle $\Omega_{sleeve}$ with regard to a line, L, that is substantially parallel or normal with respect to the shaft-gripping portion 34, and also with respect to the longitudinal axis of the boot 14. In the illustrated embodiment, the line, L, intersects the transition between the shaft-gripping portion 34 and the sleeve portion 38. In an embodiment the sleeve angle $\Omega_{sleeve}$ is, for example and without limitation, at or between 25 and 45 degrees. In another embodiment the sleeve angle $\Omega_{sleeve}$ is at or between 32 and 38 degrees.

In an embodiment, the ratio of the diameters ($a_1$, $a_2$) between the shaft-gripping portion 34 and the joint-connecting portion 36 is, for example and without limitation, at or around 1:3. Similarly, a ratio between the length of the shaft-gripping portion 34, $x_1$, and the joint-connecting portion 36, $x_3$, is, for example and without limitation, at or between 1:1 and 1:2. In another embodiment, the ratio between the length of the shaft-gripping portion 34, $x_1$ and the joint-connecting portion 36, $x_2$ is at or between 1:1.75 and 1:2. Also, the ratio of the length between $x_2$ and $x_1+x_3$ is at or between 1:1 and 3:1. In another embodiment, the ratio of the length between $x_2$ and $x_1+x_3$ is at or between 1:1 and 2:1. In an embodiment, the length of $x_1$ is at or between 9 mm and 26 mm, the length of $x_2$ is at or between 35 mm and 60 mm and the length of $x_3$ is at or between 10 mm and 20 mm.

Figure 3:
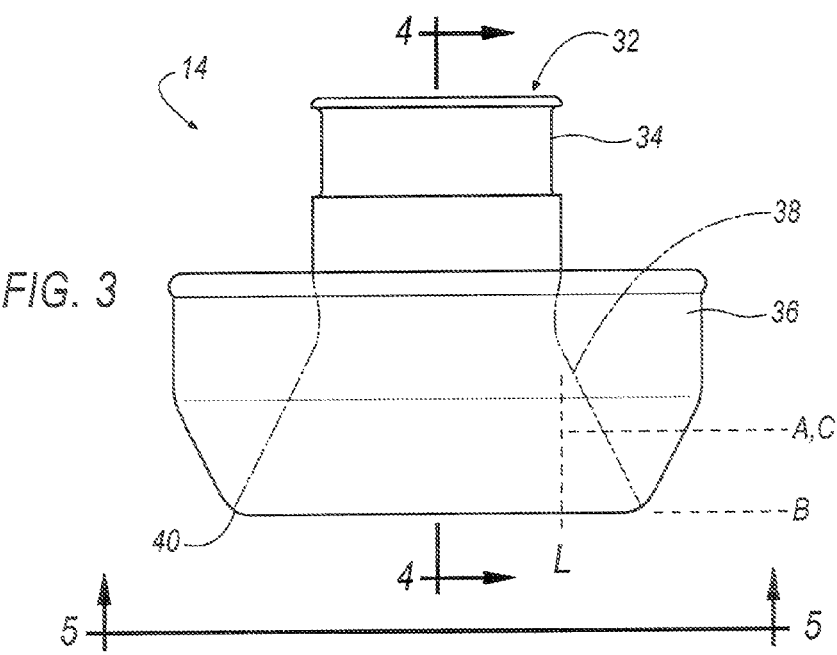
FIG. 3 is another elevated side plan view of a boot for a joint according to an embodiment of the present invention.
Figure 4:
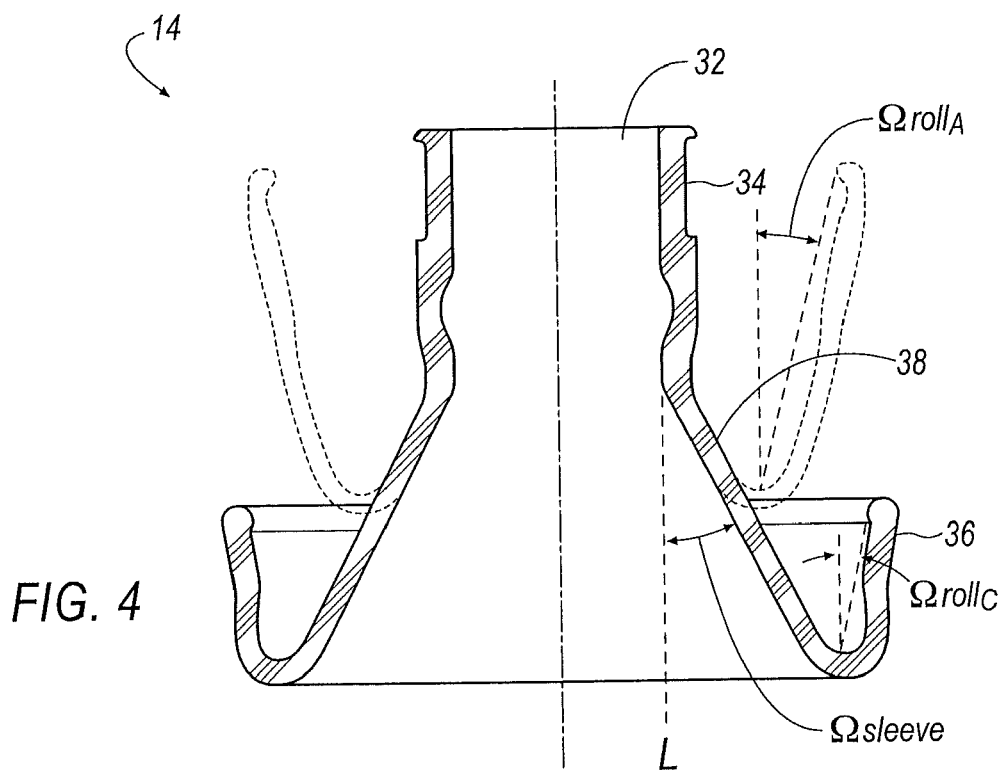
FIG. 4 is a cross-sectional view of a portion of the boot along line 4-4 in FIG. 3 according to an embodiment of the present invention.

Referring now to FIGS. 3 and 4, the boot 14 is illustrated in an exemplary normal rolled state where the boot 14 is rolled to the position designated as B in FIG. 2. For purposes of this discussion, the position designated as B will be referred to as the normal rolled state; however, it will be appreciated that one of ordinary skill in the art may configure the boot 14 to have a normal rolled state along any portion of the sleeve portion 38 and the present invention should not be so limited to the depicted normal rolled state for boot 14. It should additionally be noted, that shown in phantom are the lines A and C, which also index, or mark some of the many positions that the boot 14 may roll to, and the boot 14 may roll beyond the lines A and C.

With continued reference to FIG. 4, at the position where the boot 14 rolls, the roll has a roll surface 40 that includes a roll width $w_{roll}$. As illustrated, the roll width $w_{roll}$ and the roll surface 40 may be described as the generally exterior portion of the roll, which is related to the roll positions previously described.

Figure 5:
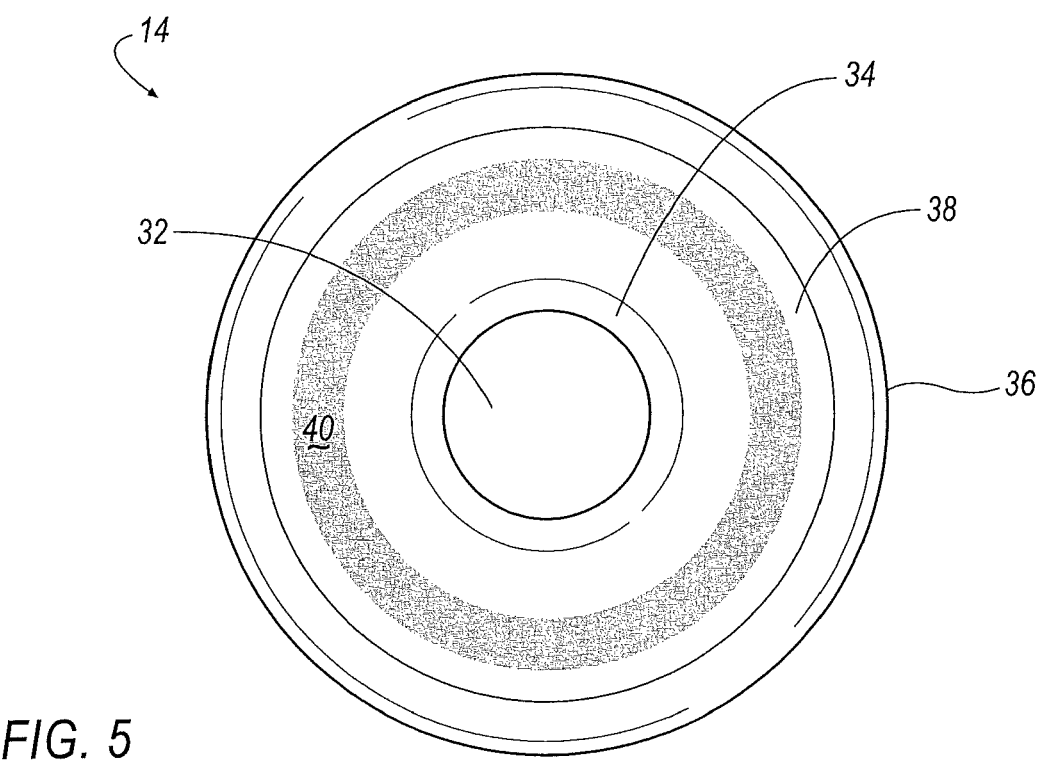
FIG. 5 is an end view taken along line 5-5 in FIG. 3 according to an embodiment of the present invention.
Figure 6:
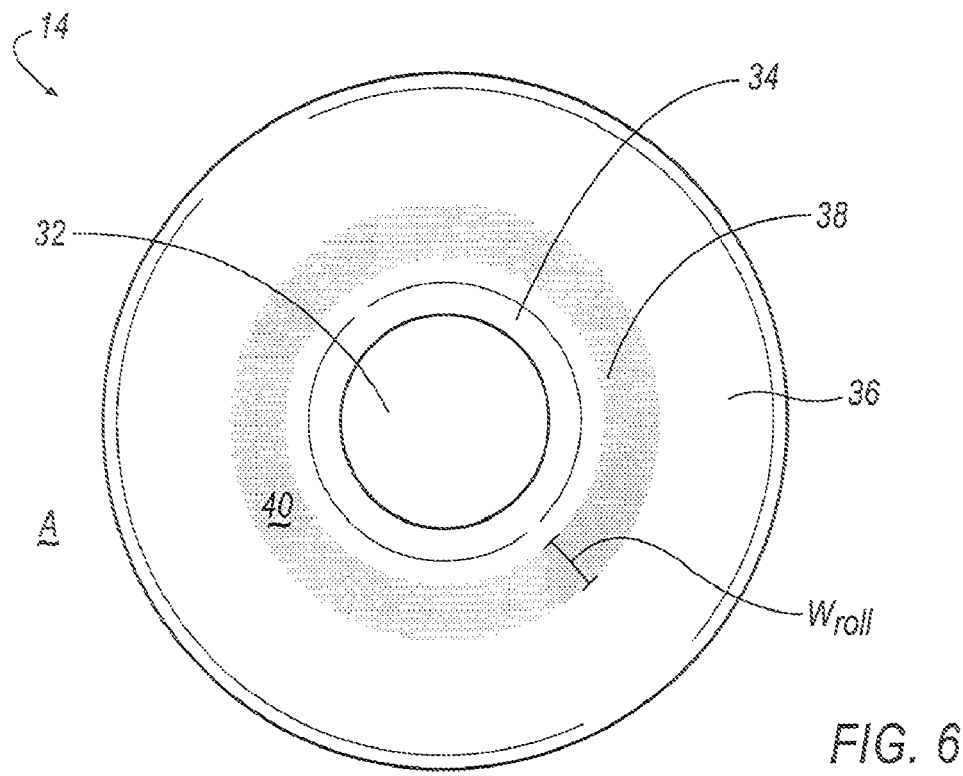
FIG. 6 is another end view taken along line 5-5 in FIG. 3 according to an embodiment of the present invention.
Figure 7:
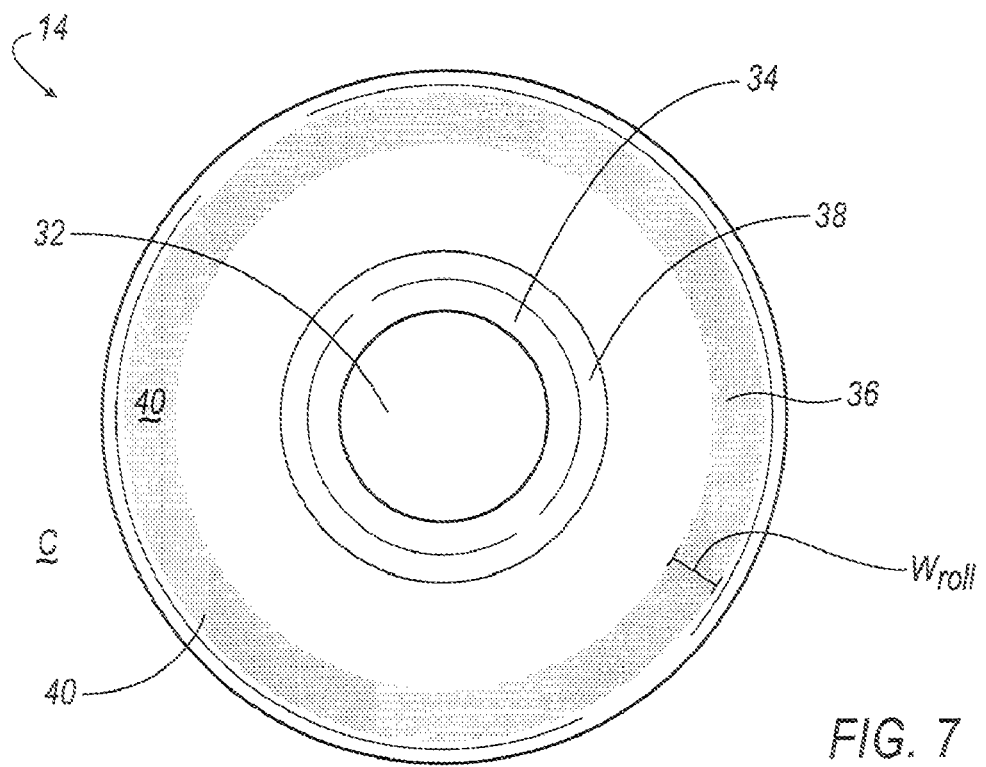
FIG. 7 is yet another end view taken along line 5-5 in FIG. 3 according to an embodiment of the present invention.

In an embodiment, the boot 14 is adapted to substantially maintaining its symmetry (i.e., maintain a generally circular formation) about the roll surface 40 as displayed in the examples depicted in FIGS. 5 through 7. The degree/extent of maintaining this symmetry along various roll positions depends, at least—in part, on the external factors that act upon the plunging position and articulation of the joint 10. One way to maintain this symmetry is to generally maintain the roll width $w_{roll}$ constant independent of the location of the roll position and the roll surface 40.

It is noted that the combination of the material thickness, t, (see FIG. 14) at portions along the boot 14, the sleeve angle $\Omega_{sleeve}$, and a roll angle $\Omega_{roll}$, illustrated in FIG. 4 generally as $\Omega_{rollA}$ and $\Omega_{rollC}$ effect or control the symmetry of the boot 14 and the roll width $w_{roll}$ as it deviates from the normal rolled position B to other positions along the length of the sleeve. Various iterations of these relational features and the effect thereof will be further discussed below, however, it should be noted that other similar combinations of these features will become obvious to one of ordinary skill in the art after considering the present disclosure without deviating from the spirit and scope of this invention.

FIG. 4 illustrates a cross-sectional view of a portion of boot 14 taken along the line 4-4 from FIG. 3 and according to an embodiment of the present invention. A roll angle $\Omega_{rollC}$ with respect to a normal line extending from center of the roll and to the joint-connecting portion 36 is also depicted. $\Omega_{rollA}$ is also illustrated in phantom to highlight the $\Delta\Omega_{roll}$ as the roll moves along the sleeve 38. The phenomenon seen in FIG. 4, that is the roll angle, $\Omega_{roll}$, of the boot, is a function of the boot material properties, the thickness of the material t that comprises the sleeve 38, the position of the roll along the boot, external forces acting on the boot, the ratio of aperture sizes $a_1$ and $a_2$ (FIG. 2), and the like. Similarly, as discussed later (and seen in FIGS. 5-7), and in an embodiment, the roll width $w_{roll}$ measured about the boot 14 at the location where the boot 14 rolls is also related as a function of these factors. In this manner, then, to substantially preserve the roll width $w_{roll}$ along the roll surface 40, such that the boot 14 is resistant to distortion independent of the different rolled positions, each of these factors is considered. In other words, in an embodiment, to substantially prevent distortion of the boot that, as described above, can result in conventional boots from the rolling of the sleeve 38 in either direction away from the normal position B, the $\Omega_{roll}$ increases moving towards A and decreases moving towards C, and thereby the roll width $w_{roll}$ of the roll surface 40 of boot 14 along the point of the roll remains the same as the roll moves towards the shaft-gripping portion 34 from B (i.e. towards C) and as the roll moves towards the joint-connecting portion 36 from B (i.e. towards A).

In an embodiment, the roll width $w_{roll}$ of the roll surface 40 of the rolled portion, as measured from the end of the boot 14, is functionally related to the sleeve angle $\Omega_{sleeve}$. The functional relationship is illustrated at different points along the sleeve 38 seen in FIGS. 5-7. That is, FIGS. 5-7 illustrate an end view of the boot 14 along the line 5-5 from FIG. 3 and according to an embodiment of the present invention. The roll width $w_{roll}$ of each boot is shaded. It should be noted that the actual size of the surface width 40 or relative change thereof from the points marked along the sleeve 38 of the boot 14 are not necessarily to scale. Rather, it is intended that the drawings simply highlight that the roll width $w_{roll}$ of roll surface 40 of the boot 14 relatively maintains constant as the roll travels along the sleeve 38. In this manner, the drawings also highlight the phenomenon of the roll width $w_{roll}$ as the roll surface 40 travels along the roll, namely, that as the diameter of the boot becomes wider (i.e. travels from positions A or B towards C), the roll width $w_{roll}$ or roll surface 40 generally stays constant.

FIG. 5 depicts the boot 14 in the normal rolled position, which, for purposes of convenience, is identified as B from FIG. 2 and FIG. 3. FIG. 6 shows the boot rolled along the line A, and FIG. 7 shows the boot rolled along the line C. In this embodiment and from these three Figures, the roll width $w_{roll}$ of roll surface 40 of the roll remains substantially the same as the roll extends up the boot. Similarly, the roll width $w_{roll}$ of roll surface 40 also remains substantially the same as the roll travels down the boot. As previously discussed and in an embodiment, at least some of the factors that affect this referenced surface width also affect the distortion of the roll, namely the $\Omega_{sleeve}$, t, and $\Omega_{roll}$.

Figure 8:
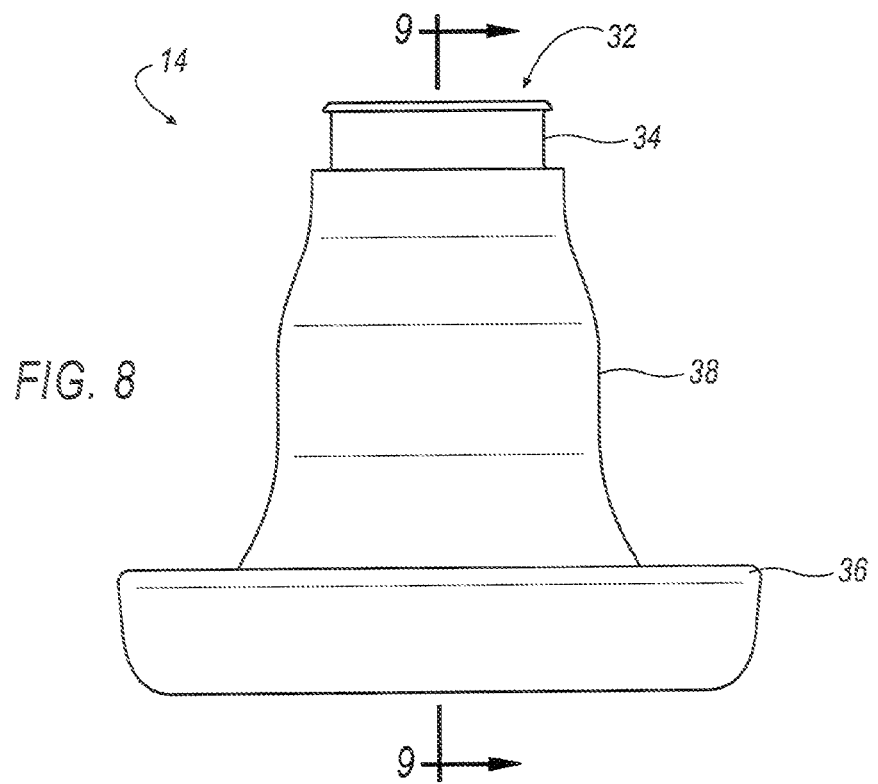
FIG. 8 is an elevated plan view of a boot for a joint according to an embodiment of the present invention.

FIG. 8 illustrates another embodiment of boot 14. An elevated side view of boot 14 is depicted having a sleeve portion 38 that varies in scope over at least one region of the sleeve 38. In the illustration and in an embodiment, the sleeve 38 of the boot 14 is configured to form an "S" shape. Although an "S" is shown and described, the sleeve portion 38 may also form an inverse "S" shape. Similarly, the sleeve portion may form a curve having changing or varying slopes. The shape of the sleeve 38 and the slope of the S, or curved portion along the sleeve, adapt to regulate or control the amount of material that appears along the surface area. In this way, the ability to regulate the amount of the surface width also affects the maintenance of the symmetry and distortion therealong.

Figure 9:
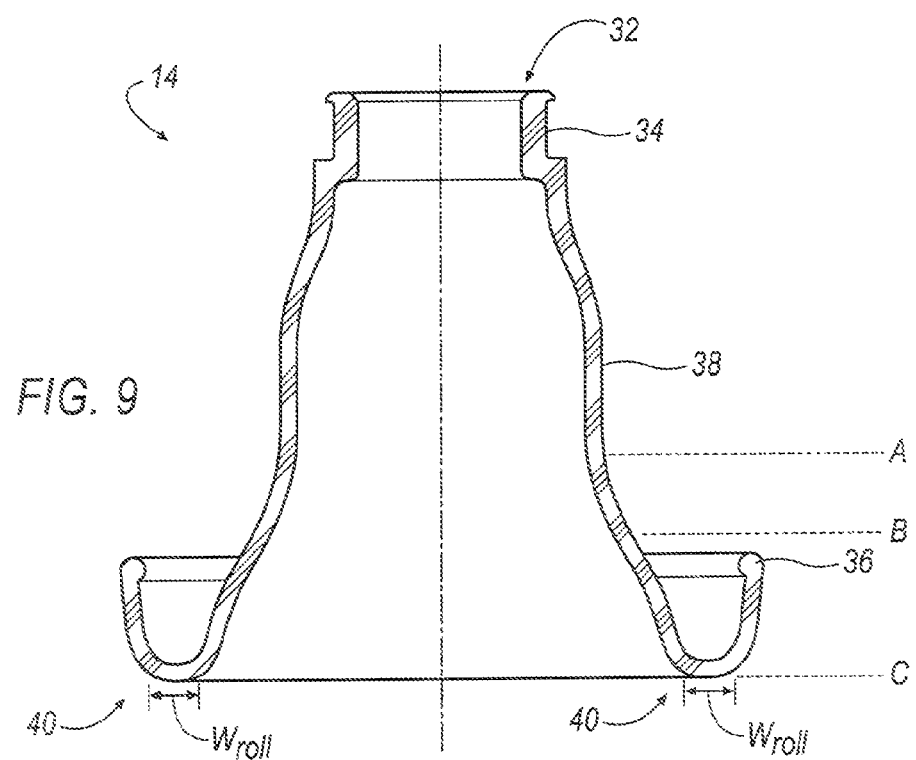
FIG. 9 is a cross-sectional view of a portion of the boot taken along line 9-9 in FIG. 8 according to an embodiment of the present invention.

FIG. 9 depicts an elevated view of a portion of the boot 14 along 9-9 from FIG. 8 according to an embodiment of the present invention. As seen in the illustration and in addition to the phenomenon already described, the rolled angle $\Omega_{roll}$ is also affected by the varying sloped sleeve 38, or changes depending on the location of the roll along the "S" structure.

Figure 10:
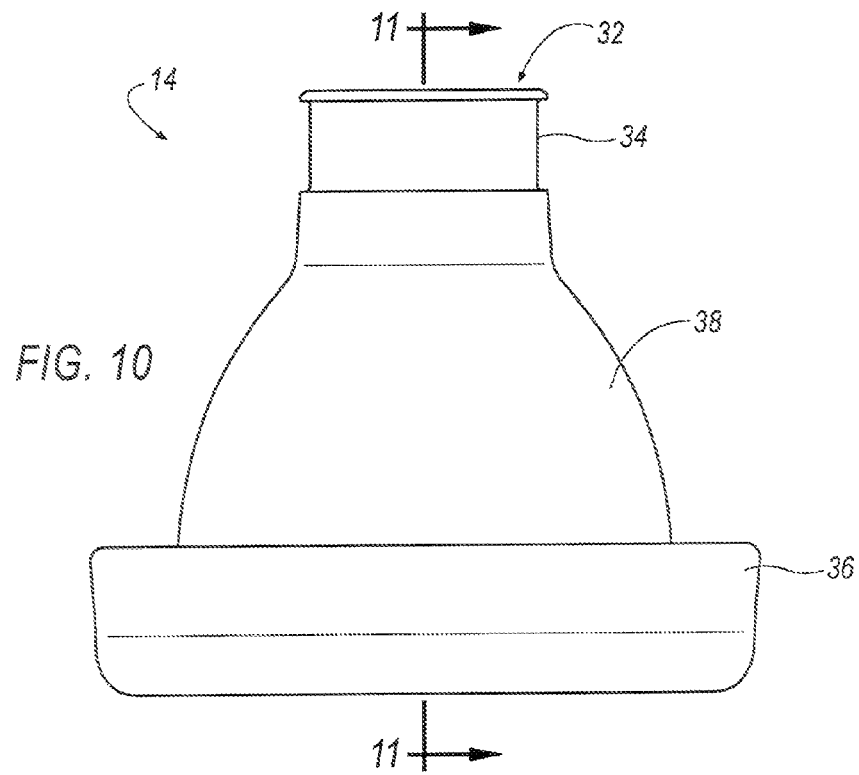
FIG. 10 is an elevated plan view of a boot for a joint according to an embodiment of the present invention.
Figure 11:
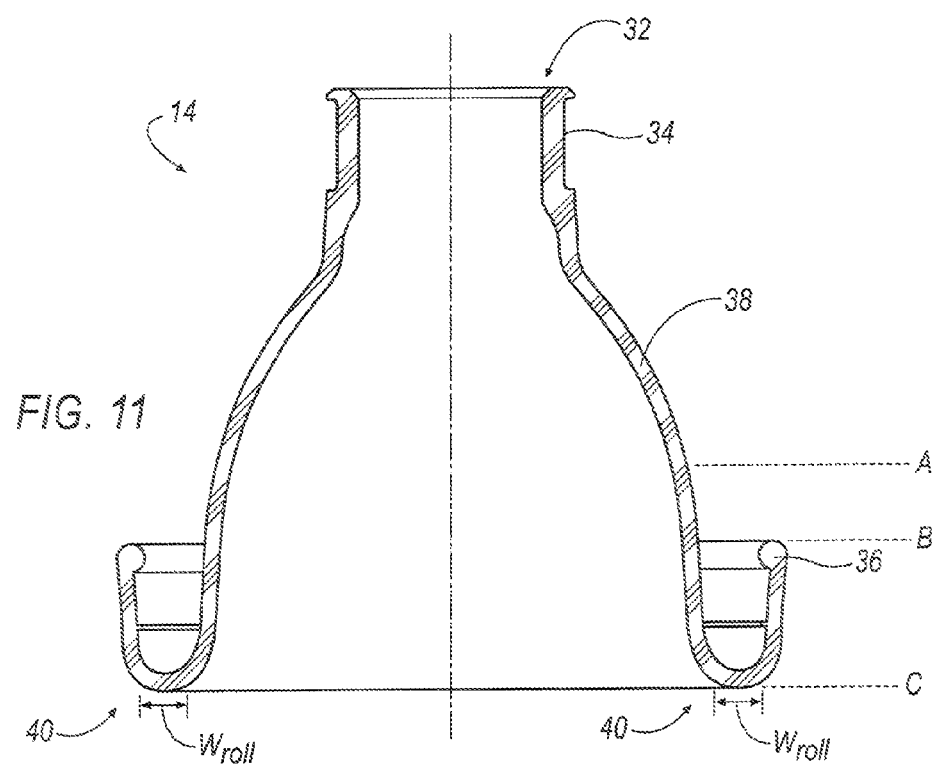
FIG. 11 is a cross-sectional view of a portion of the boot taken along line 11-11 in FIG. 10 according to an embodiment of the present invention.

FIG. 10 is an elevated side view of another boot 14 according to another embodiment of the present invention. In this embodiment, the sleeve 38 includes a curved edge near the shaft-gripping portion 34. In an embodiment, the boot 14 also rolls to various positions along the sleeve 38 generally without resulting in distortion about the surface 40 of the roll. That is, the slope of the sleeve 38 also affects the factors as previously discussed. FIG. 11 is a cross-sectional view of a portion of the boot along 11-11 in FIG. 10 according to an embodiment of the present invention.

Figure 12:
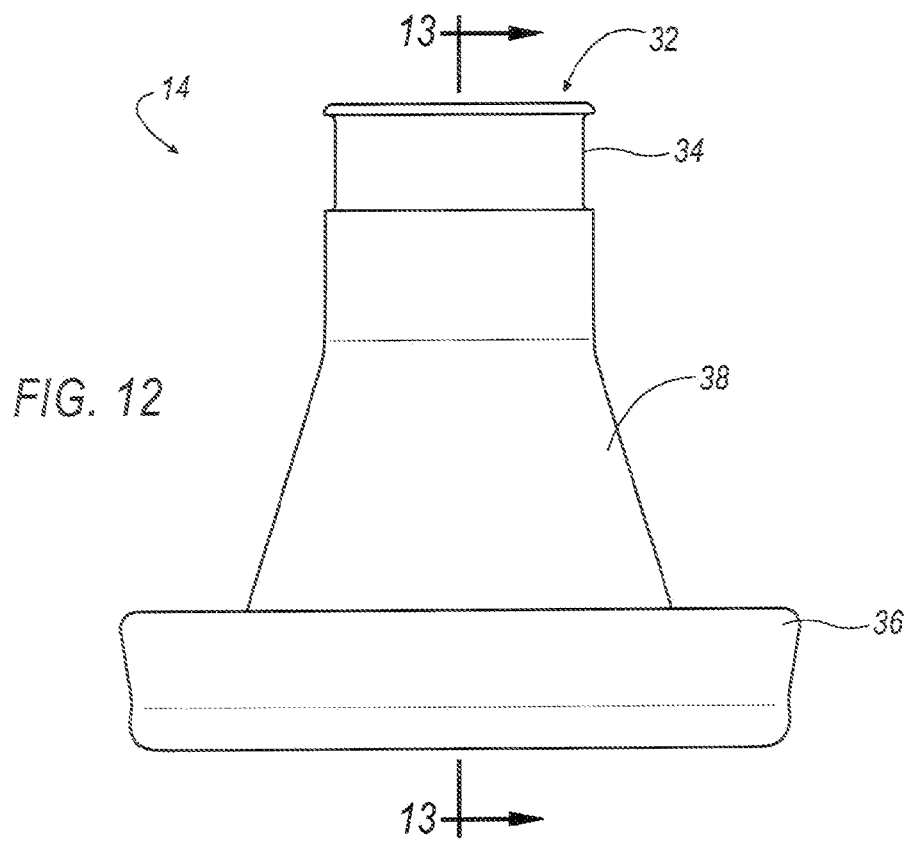
FIG. 12 is an elevated plan view of a boot for a joint according to an embodiment of the present invention.
Figure 13:
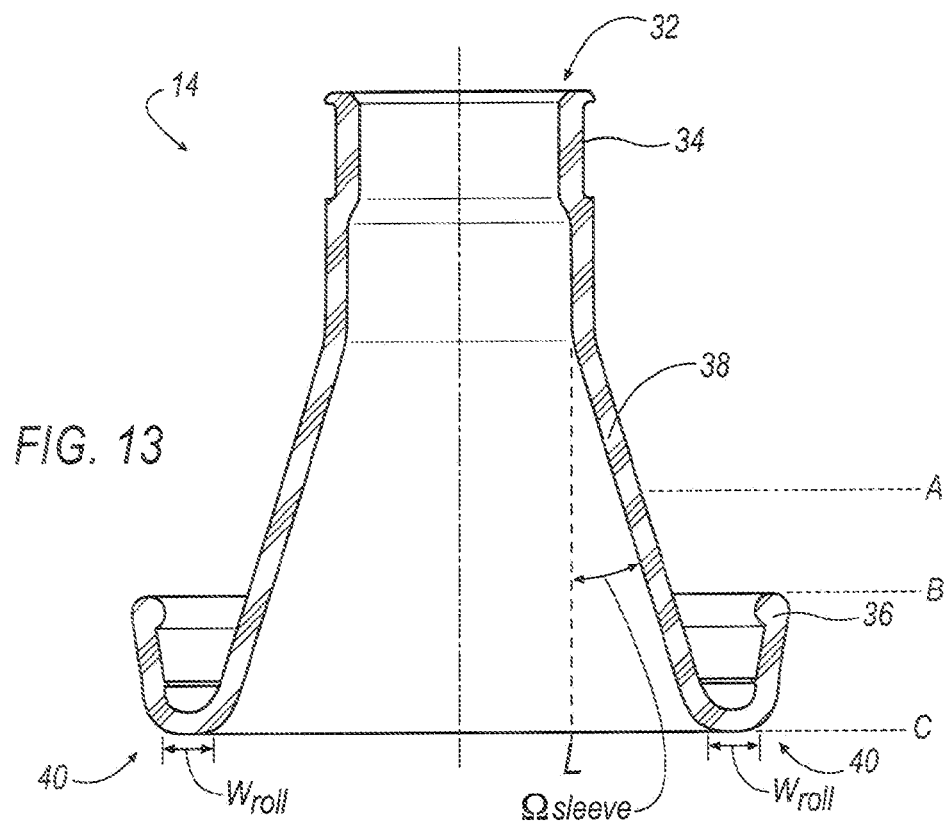
FIG. 13 is a cross-sectional view of a portion of the boot taken along line 13-13 in FIG. 12 according to an embodiment of the present invention.

FIG. 12 is an elevated side view of a boot 14 for a joint according to another embodiment of the present invention. In this embodiment, the slope of the sleeve 38 is relatively constant. FIG. 13 is a cross-sectional view of a portion of the boot along 13-13 in FIG. 12 according to an embodiment of the present invention. In the depicted embodiment, the shaft-gripping portion 34 extends a distance beyond the boot 14 represented in FIGS. 2 and 3. That is, in this embodiment the ratio between the shaft-gripping portion 34 and the joint-connecting portion 36 is at or about 2:1. In addition, the angle $\Omega_{sleeve}$ between the shaft-gripping portion 34 and the sleeve portion 38 is greater than the angle $\Omega_{sleeve}$ of the boot illustrated in FIG. 2.

Figure 14:
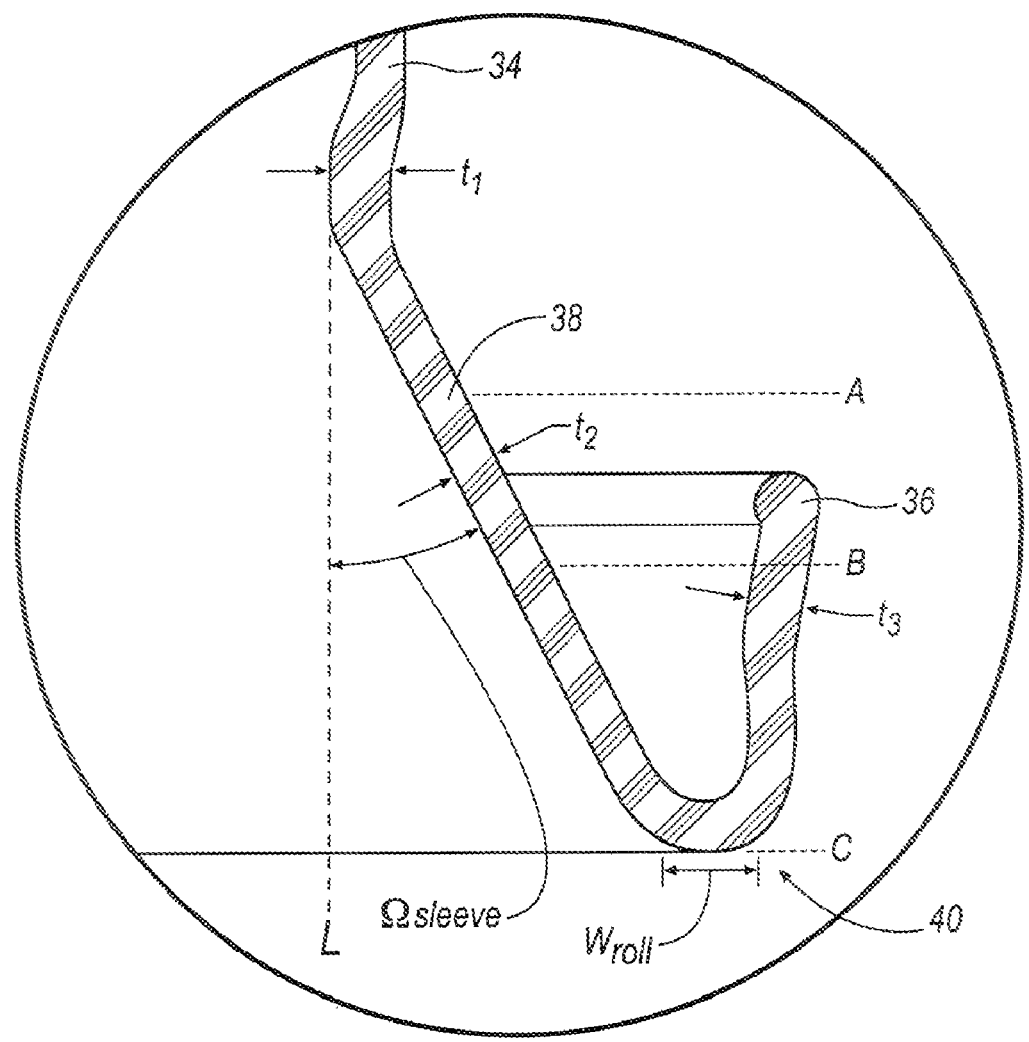
FIG. 14 is an exploded view of a portion of a boot.

FIG. 14 illustrates a portion of the boot 14 from FIGS. 2 through 4, as featured in FIG. 4. The boot 14 includes a shaft-gripping portion 34 having a first thickness $t_1$ and a first aperture 32 having a diameter $a_1$, a sleeve portion 38 having a second thickness $t_2$, and a joint-connecting portion 36 having a third thickness $t_3$ and an aperture 30 having a second diameter $a_2$. In the depicted embodiment, the thickness $t_1$ of the shaft-gripping portion 34 and the thickness $t_2$ of the sleeve portion 38 are not proportional, but rather are a function of the boot material properties, sleeve angle $\Omega_{sleeve}$, external forces acting on the boot, the ratio of the diameters ($a_1$, $a_2$), and the like. That is, in an embodiment, by increasing $t_1$, $t_2$ cannot be proportionally increased without losing the stability of the boot 14. However, in the depicted embodiment, the thickness $t_1$ of the shaft-gripping portion 34 and the thickness $t_3$ of the joint connecting portion 36 are proportional, and are a function of the boot material properties, sleeve angle $\Omega_{sleeve}$, external forces acting on the boot, the ratio of the diameters $a_1$ and $a_2$, the thickness $t_2$ of the sleeve portion 38, and the like. That is, in an embodiment, by increasing can, be increased proportionally without losing the stability of the boot 14. This is not a necessary feature and should not be interpreted as such. In other words, the stability of the connecting regions of the boot 14 directly affects the stability of the sleeve portion 38 of the boot 14. In an embodiment, $t_3$ is at or between 1 and 4 mm.

With continued reference to FIGS. 2 and 14, in an embodiment, $t_1$ may be set at or about 2.75 mm, $t_2$ may be set at or about 2.0 mm, and $t_3$ may be set at or about 2.5 mm. In this embodiment, the ratio of the diameters ($a_1$, $a_2$) may be set at or around 1:2.9. In another embodiment, $t_1$ may be set at or about 2.75 mm, $t_2$ may be set at or about 1.7 mm, and $t_3$ may be set at or about 2.5 mm. In this embodiment, the ratio of diameters ($a_1$, $a_2$) may be set at or about 1:3.38. In yet another embodiment, the thickness $t_1$ may be set at or about 2.75 mm, the thickness $t_2$ may be set at or about 2.2 mm, and the thickness $t_3$ may be set at or about 2.5 mm. In this embodiment, the ratio of diameters ($a_1$, $a_2$) may be set at or about 1:2.65. Therefore, $t_1$ may be set at or between 2.5 mm and 3 mm, $t_2$ may be set at or between 1.5 mm and 2.5 mm, $t_3$ may be set at or between 2 and 3 mm, and the ratio of diameters ($a_1$, $a_2$) may be set at or between about 1:2 and 1:4. It should additionally be noted that the preceding embodiments are simply intended as examples of some of the ways to realize the present invention, not limitations. Therefore, the invention should not be limited only to the disclosed combinations. After considering the present disclosure, one of ordinary skill in the art will readily recognize other suitable combinations.

It should also be noted that the boot 14 may be comprised of rubber, including hydrogenated nitrile butadiene rubber ("HNBR") and chloroprene rubber ("CR"). However, other similar materials may be used, for example, silicone, alternate rubbers, or the like. In an embodiment, the material stress is at or between 0.40 MPa and 0.80 MPa when a combination of forces are applied to the material. Examples of such combined forces include, without limitation, force from the grease pressure, centrifugal force, and the like.

In an embodiment, the transition between one or more of the thicknesses t1, $t_2$ and t3 is generally a step transition. That is, the first transition between the thickness of the material between the shaft-gripping portion 34 and the sleeve portion 38 is rapid as is the second transition between the sleeve portion 38 and the joint-connecting portion 36. Such transitions allow the sleeve thickness $t_2$ to be thin while substantially maintaining stability and symmetry against other forces acting on the boot 14.

FIGS. 15-22 highlight the boot 14 at different positions along the roll and at different plunge depths. The arrows depicted generally represent the direction of translation of the shaft 16 as it moves inwardly towards the joint portion 13 from the shaft's normal position represented in FIG. 1 and outwardly away from the joint portion 13 from the shaft's normal position. However, it is first noted that the boot 14 could be manufactured at any of these positions or somewhere therebetween. Thus, the normal position of the shaft 16 may deviate from the illustrated, exemplary embodiment such that the shaft normal position and the boot normal position.

Figure 15:
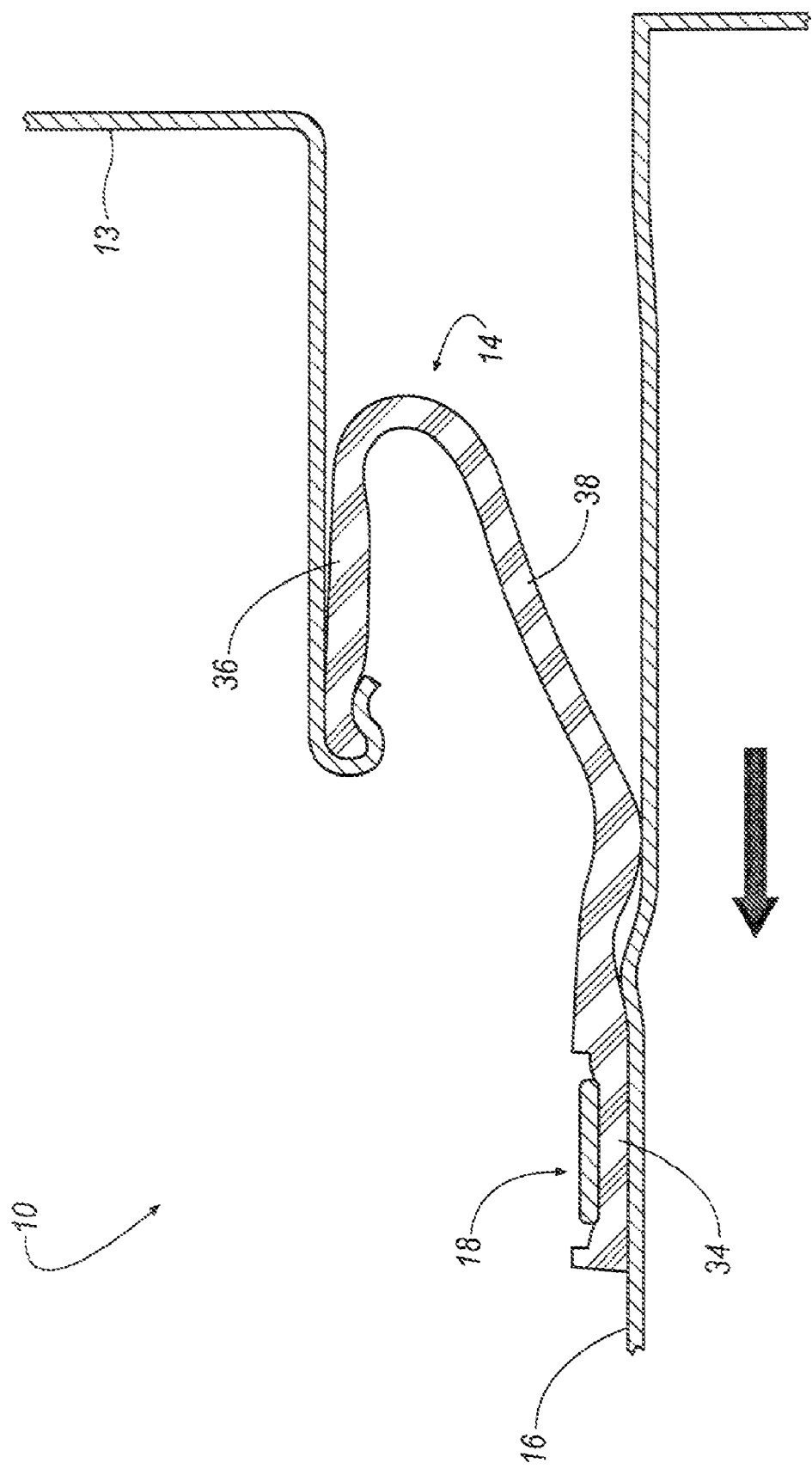
FIG. 15 is an exploded view of a portion of a boot in a position along a roll according to another embodiment of the present invention.
Figure 16:
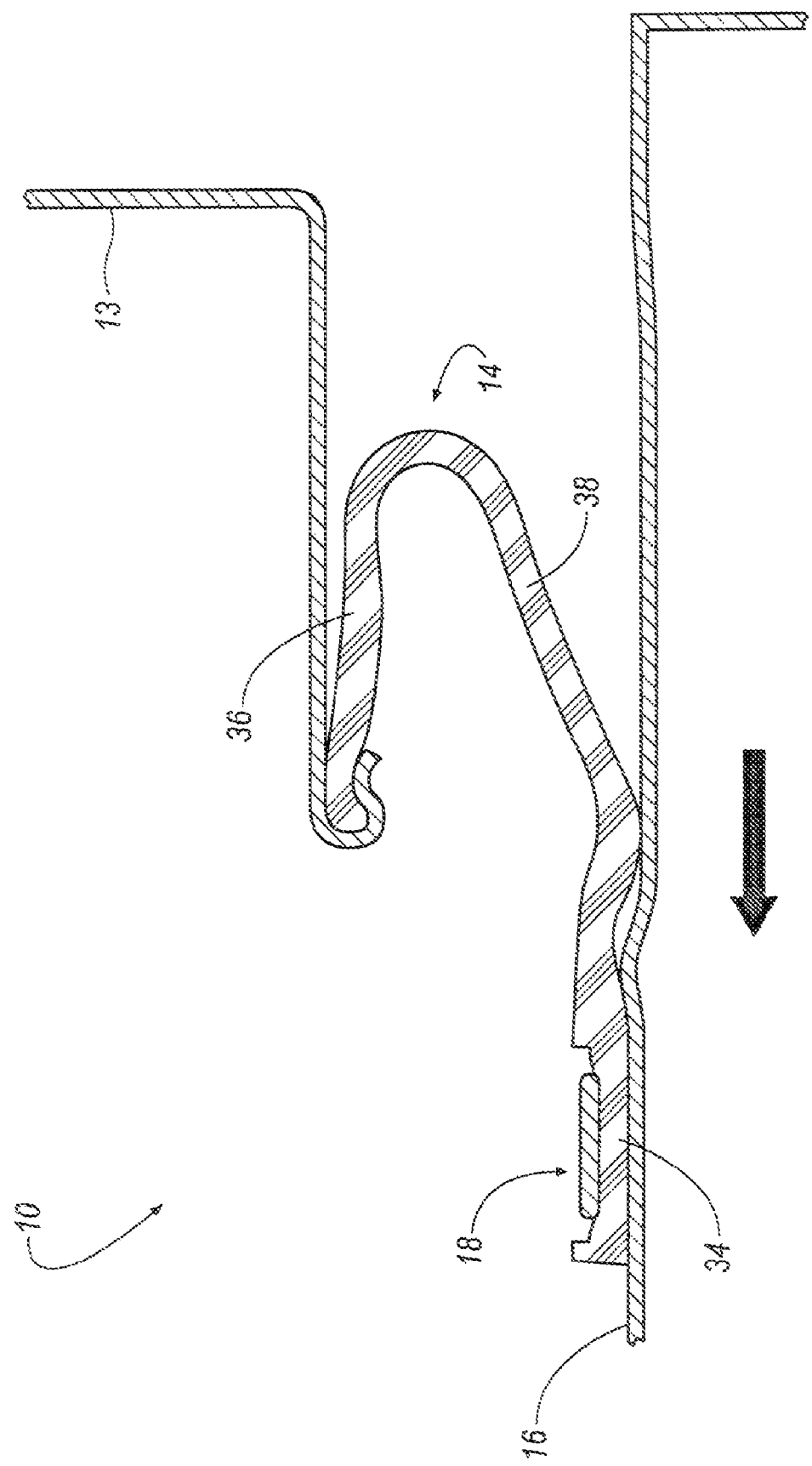
FIG. 16 is an exploded view of a portion of the boot from FIG. 15 in another position along the roll.
Figure 17:
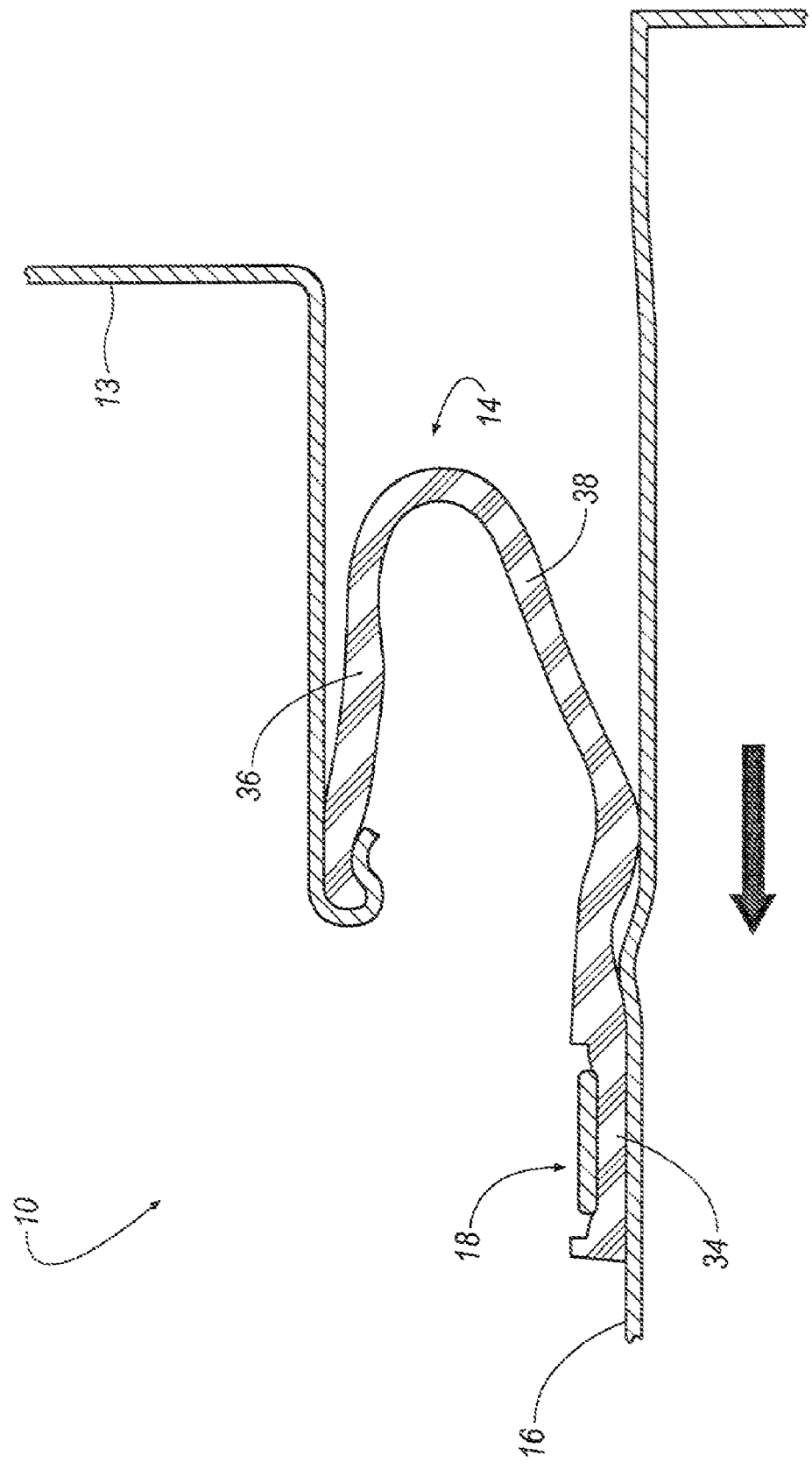
FIG. 17 is an exploded view of a portion of the boot from FIG. 15 in yet another position along the roll.
Figure 18:
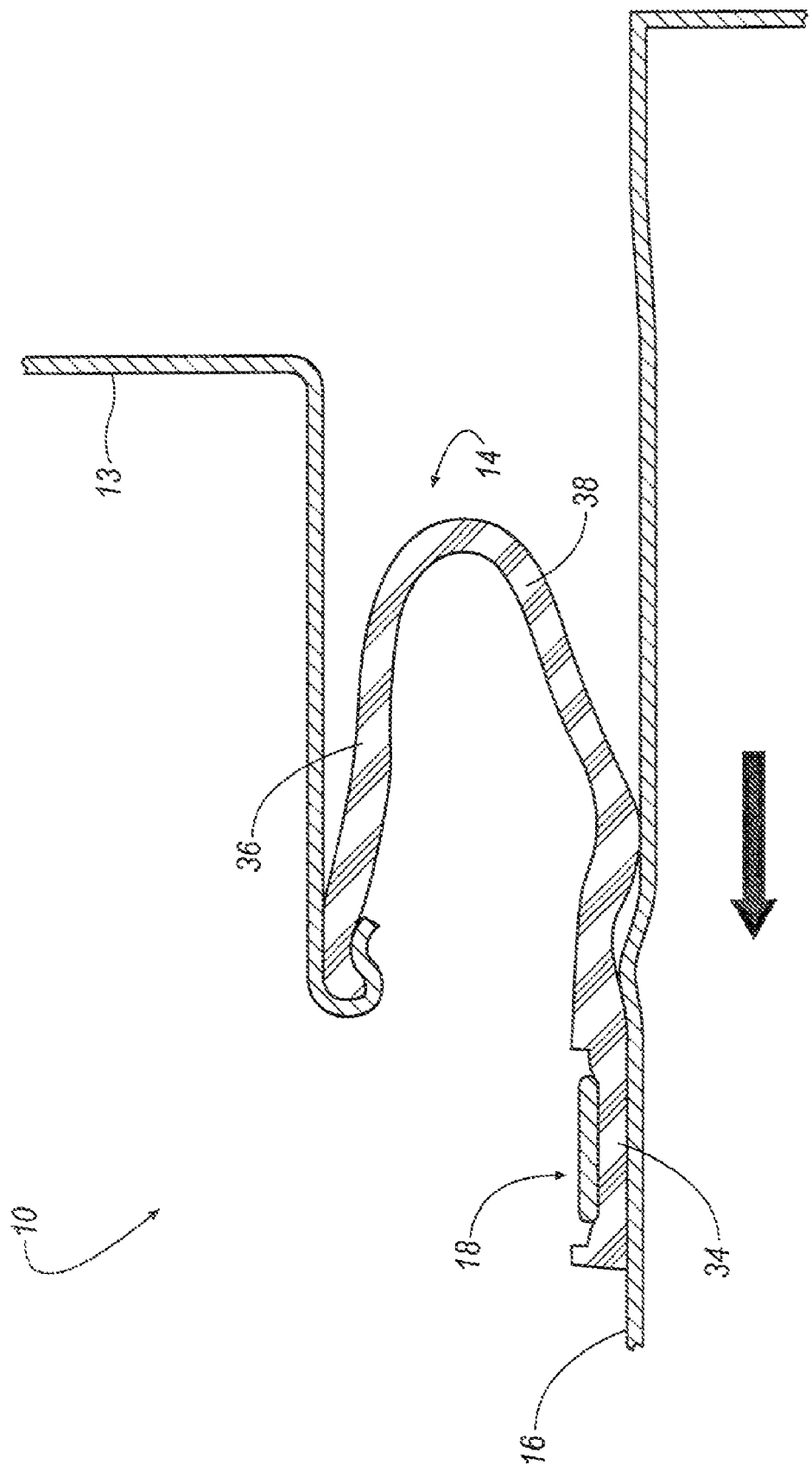
FIG. 18 is an exploded view of a portion of the boot from FIG. 15 in yet another position along the roll.

For illustrative purposes, FIGS. 15-18 illustrate four plunge depths that extend the boot 14 from its normal position as provided in FIG. 1 and FIG. 3. In an embodiment, FIG. 15 illustrates the shaft 16 extending outwardly from the joint portion 13 at a distance of 20 mm from the normal position and thereby extending the boot 14. Similarly, FIG. 16 illustrates the shaft 16 extending outwardly from the joint portion 13 at a distance of 15 mm from the normal position. Also, FIG. 17 illustrates the shaft 16 extending outwardly from the joint portion 13 at a distance of 10 mm from the normal position. Finally, FIG. 18 illustrates the shaft 16 extending outwardly from the joint portion 13 at a distance of 5 mm from the normal position. As was noted earlier, one of ordinary skill in the art may designate any position along the sleeve portion 38 and the invention should not be limited to the exemplary normal position.

Similarly, FIGS. 19-22 illustrate four plunge depths that show the boot compressed at various positions away from the normal position. In this manner, the shaft 16 is plunged inwards, towards the joint portion 13. In an embodiment, FIG. 19 illustrates the shaft 14 moved towards the joint portion 13 at a distance of 5 mm from the normal position. Similarly, FIG. 20 illustrates the shaft 16 extending inwardly towards the joint portion 13 at a distance of 10 mm from the normal position. Also, FIG. 21 illustrates the shaft 16 extending inwardly towards the joint portion 13 at a distance of 15 mm from the normal position. Finally, FIG. 22 illustrates the shaft 16 extending inwardly toward the joint portion 13 at a distance of 20 mm from the normal position.

The foregoing embodiments were chosen and described in order to illustrate principles of the methods and apparatuses as well as some practical applications. The preceding description enables others skilled in the art to utilize methods and apparatuses in various embodiments and with various modifications as is suited to the particular use contemplated. It is intended that the scope of the present methods and apparatuses be defined by the following claim(s). In accordance with the provisions of the patent statutes, the principles and modes of operation of this invention have been explained and illustrated in exemplary embodiments. However, it must be understood that this invention may be practiced otherwise than is specifically explained and illustrated without departing from its spirit or scope.

It is to be understood that the above description is intended to be illustrative and not limiting. Many embodiments will be apparent to those of skill in the art upon reading the above description. Therefore, the scope of the invention should be determined, not with reference to the above description, but instead with reference to the appended claims, along with the full scope of equivalents to which such claims are entitled.

What is claimed is:

1. A boot for a joint, comprising:
   a shaft-gripping portion,
   a joint-connecting portion, and
   a sleeve portion having an axis and connecting the joint-connecting portion with the shaft-gripping portion, wherein the sleeve portion is generally defined by a frusto-conical surface portion in a non-roll configuration, wherein the sleeve portion is defined, at least in part, by a generally annular deflected portion when in a roll configuration, wherein the deflected portion, when in the roll configuration, is at least partially defined by a roll surface, wherein the roll surface is generally defined by an outer surface of the sleeve portion that is deflected from the frusto-conical surface portion to a generally circular formation when viewed along a plane, wherein the sleeve axis lies in the plane, wherein the sleeve portion includes a first portion and a second portion, wherein the deflected portion is the first portion of the sleeve portion in a first roll configuration and the deflected portion is the second portion of the sleeve portion in a second roll configuration, and wherein the generally circular formation, remains generally constant independent of the roll configuration.

2. A boot for a joint according to claim 1, wherein the shaft-gripping portion has a first thickness, $t_1$, the sleeve portion has a second thickness, $t_2$, and the joint-connecting portion has a third thickness, $t_3$, and wherein the second thickness, $t_2$, is less than the first thickness, $t_1$.

3. A boot for a joint according to claim 2, wherein the first thickness, $t_1$, is at or between 2.5 mm and 3 mm, the second thickness, $t_2$, is at or between 1.5 mm and 2.5 mm, and the third thickness, $t_3$, is at or between 2 mm and 3 mm.

4. A boot for a joint according to claim 3, wherein the first thickness, $t_1$, is at or about 2.75 mm, the second thickness, $t_2$, is at or about 2.0 mm, and the third thickness, $t_3$, is at or about 2.5 mm.

5. A boot for a joint according to claim 2, further comprising one of a first step transition between the first thickness, $t_1$, and the second thickness, $t_2$, and a second step transition is formed between the second thickness, $t_2$, and the third thickness, $t_3$.

6. A boot for a joint according to claim 1, wherein the shaft-gripping portion defines an aperture having a first diameter, $a_1$, and the joint connecting portion defines a second aperture having a second diameter, $a_2$, and wherein a ratio of the first diameter, $a_1$, to the second diameter, $a_2$, is at or between 1:2 and 1:4.

7. A boot for a joint according to claim 1, wherein the shaft-gripping portion defines an aperture having a first diameter, $a_1$, and the joint connecting portion defines a second aperture having a second diameter, $a_2$, and wherein the ratio of the first diameter, $a_1$, to the second diameter, $a_2$, is at or between one of 1:2.65 and 1:3.38.

8. A boot for a joint according to claim 1, wherein the shaft-gripping portion forms an angle, $\Omega_{sleeve}$, that is at or between 25 and 45 degrees with respect to a line, L, that is substantially parallel to a longitudinal axis of the boot.

9. A boot for a joint according to claim 8, wherein the angle, $\Omega_{sleeve}$, is at or between 32 and 38 degrees.

10. A boot for a joint according claim 1, wherein the shaft-gripping portion has a first length, $x_1$, the sleeve portion has a second length, $x_2$, and the joint-connecting portion has a third length, $x_3$, and wherein a ratio of the first length, $x_1$, to the third length, $x_3$, is at or between 1:1 and 1:2.

11. A boot for a joint according to claim 10, wherein the ratio of the first length, $x_1$, to the third length, $x_3$, is at or between 1:1.75 and 1:2.

12. A boot for a joint according to claim 10, wherein a ratio of a sum of the first length, $x_1$, and the third length, $x_3$, with respect to the second length, $x_2$, is at or between 1:1 and 1:3.

13. A boot for a joint according to claim 12, wherein the ratio of the sum of the first length, $x_1$, and the third length, $x_3$, with respect to the second length, $x_2$, it at or between 1:2 and 1:3.

14. A boot for a joint according to claim 1, wherein the first portion of the sleeve portion is generally frusto-conical when the sleeve portion is in the second roll configuration.

15. A constant velocity joint, comprising:
a shaft defined by a shaft axis;
a joint portion; and
a boot for connecting the shaft to the joint portion and adapted to allow shaft translation in an axial direction relative to the joint portion, the boot having a shaft-gripping portion, a joint-connecting portion and a sleeve portion having an axis and connecting the joint-connecting portion with the shaft-gripping portion, wherein the sleeve portion is generally defined by a frusto-conical surface portion in a non-deformed configuration, wherein the sleeve portion is defined, at least in part, by one of a plurality of generally annular deflected portions when in one of a plurality of deformed configurations, wherein the deflected portion, when in each of the plurality of deformed configurations, is at least partially defined by a roll surface, wherein the roll surface is generally defined by an outer surface of the sleeve portion that is deflected from the frusto-conical surface portion to a generally circular formation when viewed along a plane, wherein the sleeve axis lies in the plane, and wherein the generally circular formation, remains generally constant independent of the roll configuration.

16. A constant velocity joint, comprising:
a shaft defined by a shaft axis;
a joint portion; and
a boot for connecting the shaft to the joint portion and adapted to allow shaft translation in an axial direction relative to the joint portion, the boot having a shaft-gripping portion, a joint-connecting portion and a sleeve portion having a sleeve axis and connecting the joint-connecting portion with the shaft-gripping portion, wherein the sleeve portion is generally defined by a frusto-conical surface portion in a non-deformed configuration, wherein the sleeve portion is defined, at least in part, by a generally annular first deflected portion when in a first deformed configuration, the sleeve portion is defined, at least in part, by a generally annular second deflected portion when in a second deformed configuration, the sleeve portion is defined, at least in part, by a generally annular third deflected portion when in a third deformed configuration, wherein the first deflected portion is at least partially defined by a first roll surface, wherein the first roll surface is generally defined by an outer surface of the sleeve portion that is deflected from the frusto-conical surface portion to a generally circular formation when viewed along a plane, wherein the sleeve axis lies in the plane, and wherein the generally circular formation, remains generally constant independent of the roll configuration.

* * * * *